United States Patent [19]

Yamaguchi et al.

[11] 4,436,131
[45] Mar. 13, 1984

[54] PNEUMATIC RADIAL TIRES

[75] Inventors: Yutaka Yamaguchi, Tokorozawa; Nobuyuki Koizumi, Higashimurayama; Tamio Araki, Fuchu; Koichi Kojima, Higashimurayama; Nobumasa Ikeda, Kodaira, all of Japan

[73] Assignee: Bridgestone Tire Co., Ltd., Tokyo, Japan

[21] Appl. No.: 422,912

[22] Filed: Sep. 24, 1982

[30] Foreign Application Priority Data

Jan. 29, 1982 [JP] Japan ................................ 57-9916[U]

[51] Int. Cl.$^3$ ............................................. B60C 9/00
[52] U.S. Cl. ................................ 152/361 FP; 57/902; 152/356 R; 152/361 DM; 152/374
[58] Field of Search ................ 152/361 FP, 361 DM, 152/354 R, 356 R, 362 R, 374, 330 R; 57/902

[56] References Cited

U.S. PATENT DOCUMENTS 4,258,774 3/1981 Mirtain et al. ................ 152/361 FP
4,286,645 9/1981 Boileau .................... 152/361 FP X Primary Examiner—William A. Powell
Assistant Examiner—Thomas Bokan
Attorney, Agent, or Firm—Sughrue, Mion, Zinn, Macpeak & Seas

[57] ABSTRACT

A pneumatic radial tire is disclosed, which comprises as a reinforcement a belt consisting of a first belt body composed of a single ply containing metal twisted cords arranged at an inclination angle of 5°–25° with respect to the equatorial plane of the tire and embedded in a coating rubber, both end portions in widthwise direction of which being folded on the remaining central base portion thereof, and a second belt body composed of at least one rubberized ply containing inextensible cords crossed with the cords in the base portion of the first belt body. In the first belt body, the coating rubber has a dynamic modulus of 160–400 kg/cm$^2$ and a gauge of rubber interposed between the cords in the base portion and the cords in the folded portion is within a range of 1.3–4.5 times an average diameter of the cords and is not less than 2 times a gauge of the coating rubber located outside the cords in the base portion opposite to the folded portion.

6 Claims, 3 Drawing Figures

PNEUMATIC RADIAL TIRES

BACKGROUND OF THE INVENTION

1. Field of the Invention

This invention relates to an improvement of a pneumatic radial tire provided with a belt including a folded layer of metal cords.

2. Description of the Prior Art

In the belt of the radial tire are preferably used metal cords, particularly steel cords as an inextensible reinforcing material. For the structure of the belt, there is known a structure wherein plural layers each containing cords inclined at a small angle of 5°–25° with respect to an equatorial plane of the tire are simply placed one upon another so as to cross the cords of one layer with the cords of the other layer. A so-called fold belt is also known wherein both end portions of one of plural layers constituting the belt are folded in its withwise direction and such folded layer is placed on the other nonfolded layers in various forms, and the like.

The fold belt is excellent in the cornering stability and advantageous in the high-speed durability because the circumferential rigidity is high owing to the folding effect of the cord layer as compared with the structure of simply placing cord layers one upon another. In the fold belt, however, the inclination angle of the cord with respect to the equatorial plane of the tire is small, so that the cords located at the folded portion of the cord layer is locally subjected to excessive tension, whereby the cord breaking is apt to be caused under an influence of not only an external force during the running but also an internal pressure applied in the vulcanization building of the tire. As a result, the improvement of expected durability is not yet developed at present.

SUMMARY OF THE INVENTION

It is, therefore, an object of the invention to provide pneumatic radial tires which advantageously solve the occurrence of cord breaking.

According to the invention, there is provided in a pneumatic radial tire comprising a tread portion, a pair of sidewall portions extending from both sides of the tread, a pair of bead portions extending from the sidewall portions, a carcass of radial structure extending from one bead portion to the other and composed of at least one rubberized ply containing cords therein, and a belt superimposed about a crown portion of the carcase and consisting of a first belt body composed of a single ply containing metal twisted cords arranged at an inclination angle of 5°–25° with respect to the equatorial plane of the tire and embedded in a coating rubber, both end portions in widthwise direction of which being folded on the remaining central base portion thereof, and a second belt body composed of at least one rubberized ply containing inextensible cords inclined with respect to the equatorial plane and crossed with the cords in the base portion of the first belt body, the improvement in which the coating rubber for the first belt body has a dynamic modulus of 160–400 kg/cm² and a gauge of rubber interposed between the cords in the base portion and the cords in the folded portion is within a range of 1.3–4.5 times an average diameter of the cords and is not less than 2 times a gauge of the coating rubber located outside the cords in the base portion opposite to the folded portion.

BRIEF DESCRIPTION OF THE DRAWINGS

The invention will now be described in detail with reference to the accompanying drawings, wherein.

DESCRIPTION OF THE PREFERRED EMBODIMENT

Figure 1:
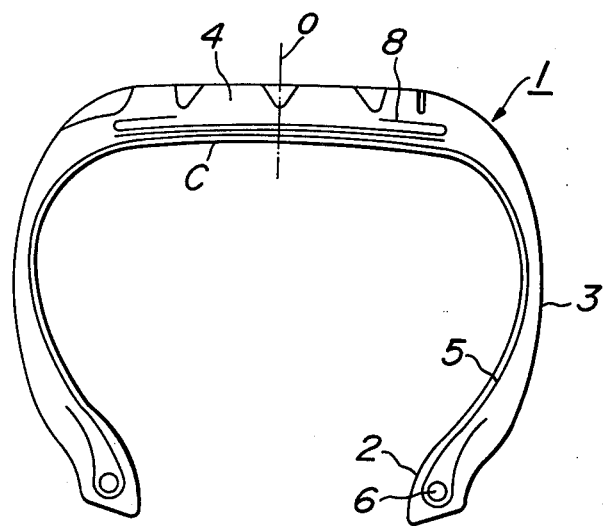
FIG. 1 is a schematically sectional view of an embodiment of the pneumatic radial tire according to the invention.

In FIG. 1, a pneumatic radial tire 1 comprises a pair of sidewall portions 3 each provided at its radially inner edge with a bead portion 2 and a tread portion 4 extending between the sidewall portions at their radially outer ends opposite to the bead portions 2 and is reinforced with a carcass 5 of radial structure extending from one bead portion 2 to the other bead portion 2 through the sidewall portions 3 and tread portion 4 and a belt 8 superimposed about a crown portion C of the carcass 5 over a whole width of the tread portion 4. The carcass 5 is composed of at least one rubberized ply containing fiber cords such as nylon, rayon, polyester, aromatic polyamide or the like arranged at an angle of approximately 90° with respect to an equatorial plane 0 of the tire, and both ends thereof are wound upwardly around bead wires 6 to form turnups.

Figure 2:
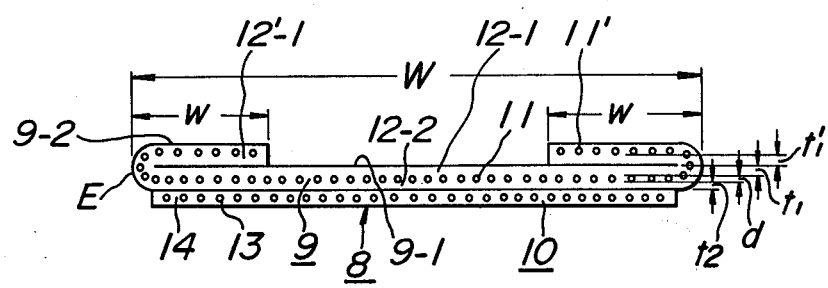
FIG. 2 is an enlarged sectional view of the belt in the tire of FIG. 1.
Figure 3:
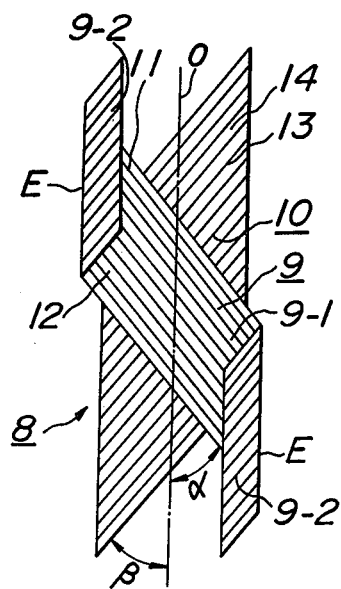
FIG. 3 is a schematically plan view of the belt shown in FIG. 2.

As shown in FIGS. 2 and 3, the belt 8 according to the invention consists of a first belt body 9 composed of a single cord ply and having folded portions at its both ends, and a second belt body 10 located closely beneath the first belt body 10 and composed of at least one non-folded rubberized cord ply. In the illustrated embodiment, the second belt body is composed of one cord ply. The first belt body 9 is composed of a single ply containing metal twisted cords 11 arranged at an inclination angle $\alpha$ of 5°–25° with respect to the equatorial plane 0 of the tire and coated at both surfaces with coating rubbers 12-1 and 12-2, both end portions of which being folded in the widthwise direction to form folded portions 9-2 on a base portion 9-1 corresponding to the remaining central portion of the ply. The rubber interposed between the cords 11 in the base portion 9-1 and the cords 11' in the folded portion 9-2 is entirely composed of the coating rubber in the embodiment of FIG. 2, whose gauge (thickness) $t_1+t_1'$ is within a range of 1.3–4.5 times, preferably 1.5–3.0 times an average diameter d of the metal twisted cords 11 and is required to be not less than 2 times, preferably 2.4–6.0 times a gauge (thickness) $t_2$ of the coating rubber 12-2 in the base portion opposite to the folded portion. According to the invention, the coating rubber for the first belt body has a dynamic modulus of 160–400 kg/cm², preferably 200–300 kg/cm². Moreover, when the thicknesses of the coating rubbers 12-1 and 12-2 in FIG. 2 are $t_1+t_1'=2t_2$ or $t_1=t_1'=t_2$, another additional rubber sheet having the same dynamic modulus as described above may be inserted between the coating rubbers 12-1 and 12'-1 at a width corresponding to the width w of the folded portion.

According to the above mentioned construction of the first belt body, an appropriate curvature is given to the bending part, while an interlaminer shearing stress applied to the region w of the folded portion 9-2 is properly mitigated by the coating rubbers 12-1 and 12'-1 and at the same time an undesirable reduction of rigidity in that portion is completely prevented.

Moreover, the width w of the folded portion is preferably within a range of 17–40% of a whole width W of the first belt body 9. On the other hand, the width of the second belt body 10 should be somewhat narrower than the width W of the first belt body.

As the cord 11 used in the first belt body according to the invention, it is desired to use elastic metal cords producing an elongation of 0.3–2.5% under a load of 5 kg/cord. The cords having such an elongation can be produced by previously giving a helical form to metal filaments having a diameter of 0.12–0.4 mm, which are subjected to a plating treatment required in the production stage of cords, and twisting predetermined number of these filaments into layer construction or strand construction at a given twisting pitch. Since such cords have a space between mutual filaments constituting the cord, not only excessive tension, which is apt to be applied to the bending part E, is avoided when the tire is built by vulcanization under pressure, but also the coating rubber penetrates into the spaces of the cord at the vulcanization step to effectively mitigate a tension produced by external force during the running. Moreover, the elongation of 0.3–2.5% under a load of 5 kg/cord is a value at such a state that rubber does not yet penetrate into the cord. In this case, when the elongation is less than 0.3%, the resulting cord can not be said to be an elastic cord in the light of the object of the invention, while when the elongation exceeds 2.5%, the twists of the cord loosen in the cutting of the cord during the manufacture of the tire and hence the handling of the cord beomes difficult.

The cord 13 for the second belt body 10, may be of any inextensible cords, for instance, the same elastic metal cords as in the first belt body, nonelastic metal cords usually used, polyester fiber cords, rayon fiber cords, aromatic polyamide fiber cords and the like. An angle $\beta$ of the cord 13 with respect to the equatorial plane 0 is properly selected within a range of 5°–25° in accordance with use purposes. In this case, it is a matter of course that properties of a coating rubber 14 are selected in compliance with the material of the cord used. As regards the arrangement of the first belt body 9 and the second belt body 10, a structure of reversing the belt 8 above and beneath as a whole, a structure of closely disposing the second belt body 10 on the folded portions of the first belt body 9 and the like may optionally be selected in addition to the illustrated embodiment in accordance with the application of tires.

Three test tires having a size of 195/70 VR 14, two of which being tires according to the invention and the other of which being the conventional tire, were manufactured and their effects for preventing the cord breaking were examined by a durability test. In the test tire, two rubberized plies each containing cords of polyester fiber of 1000 d/2 arranged at an angle of 90° with respect to the equatorial plane of the tire were used as a carcass. The arrangement of the first and second belt bodies in the belt was the embodiment shown in FIGS. 2 and 3, wherein the width W of the first belt body was 140 mm and the width w of the folded portion was 45 mm and hence the ratio w/W was w/W×100=32%. The cord for the first and second belt bodies were steel cords of 1×5 construction (filament diameter=0.25 mm), and cord angles $\alpha$ and $\beta$ were 22°, respectively. The details in the differences between the test tires for the structure of the first belt body are shown in the following table.

| | Conventional tire | Invention tire A | Invention tire B |
|---|---|---|---|
| Elongation of cord (under a load of 5 kg/cord) (%) | 0.2 | 0.2 | 1.2 |
| Average diameter d of cord 11 (mm) | 0.67 | 0.67 | 0.69 |
| Gauge $(t_1 + t'_1)$ of coating rubber (mm) | 0.61 | 1.2 | 1.2 |
| Gauge $t_2$ of coating rubber 12-2 (mm) | 0.305 | 0.305 | 0.305 |
| $(t_1 + t'_1)/d$ | 0.91 | 1.79 | 1.74 |
| $(t_1 + t'_1)/t_2$ | 2.0 | 3.9 | 3.9 |
| Dynamic modulus of coating rubber (kg/cm$^2$) | 150 | 240 | 240 |

Note
The numerical value of dynamic modulus was measured by the well-known method wherein a sample with a length of 25 mm and a width of 5 mm was cut out from the coating rubber for the first belt body placed on a high-power spectrometer made by Iwamoto Seisakusho at 5% elongated state, and vibrated at room temperature under a frequency of 50 Hz and a dynamic strain of 1%.

The test tire was mounted on a standard rim under an internal pressure of 1.9 kg/cm$^2$ and continously run on a drum at a speed of 50 km/hr and a slip angle of 3° under a load of 579 kg for 7 days.

After the completion of the running, the tire was checked by cutting. As a result, the conventional tire showed that remarkable cord breaking is discontinuously caused in the bending part of the first belt body toward its circumferential direction and also indications of separation failure are found between the base portion and the folded portion of the first belt body. On the other hand, the invention tire A showed that the cord breaking occurs at only two positions in the circumferential direction of the bending part but no indication of separation failure is found, while the invention tire B showed no cord breaking and separation failure.

As mentioned above, the pneumatic radial tires according to the invention are large in the circumferential rigidity and have excellent cornering stability and high-speed durability because the cord breaking is hardly caused in the bending part of the first belt body, so that they are very useful in practical use.

What is claimed is:

1. In a pneumatic radial tire comprising a tread portion, a pair of sidewall portions extending from both sides of the tread portion, a pair of bead portions extending from the sidewall portions, a carcass of radial structure extending from one bead portion to the other and composed of at least one rubberized ply containing cords therein, and a belt superimposed about a crown portion of the carcass and consisting of a first belt body composed of a single ply containing metal twisted cords arranged at an inclination angle of 5°–25° with respect to the equatorial plane of the tire and embedded in a coating rubber, both end portions in widthwise direction of which being folded on the remaining central base portion thereof, and a second belt body composed of at least one rubberized ply containing inextensible cords inclined with respect to the equatorial plane and crossed with the cords in the base portion of the first belt body, the improvement in which the coating rubber for the first belt body has a dynamic modulus of 160–400 kg/cm$^2$ and a thickness of rubber interposed between the cords in the base portion and the cords in the folded portion is within a range of 1.3–4.5 times an average diameter of the cords and is not less than 2 times a thickness of the coating rubber located outside the cords in the base portion opposite to the folded portion.

2. A pneumatic radial tire according to claim 1, wherein the rubber interposed between the cords in the base portion and the cords in the folded portion is entirely composed of the coating rubber.

3. A pneumatic radial tire according to claim 1, wherein the folded portion of the first belt body is located on the side of the tread portion.

4. A pneumatic radial tire according to claim 3, wherein the folded portion of the first belt body is located on the side of the tread portion and at the same time the second belt body is closed to the base portion of the first belt body on the side of the carcass.

5. A pneumatic radial tire according to claim 1, wherein the cord for the first belt body is an elastic metal twisted cord having an elongation of 0.3–2.5% under a load of 5 kg/cord.

6. A pneumatic radial tire according to claim 1, wherein the folded portion of the first belt body has a width corresponding to 17–40% of a whole width of the first belt body.

* * * * *